United States Patent
Anil Kumar et al.

(10) Patent No.: US 12,321,758 B2
(45) Date of Patent: *Jun. 3, 2025

(54) SYSTEM AND METHOD FOR CENTRALIZED CONFIGURATION OF DISTRIBUTED AND HETEROGENEOUS APPLICATIONS

(71) Applicant: Open Text Holdings, Inc., Menlo Park, CA (US)

(72) Inventors: Kancharla Anil Kumar, Bangalore (IN); Syed Nasir Bellary, Bangalore (IN); Sunil Kumar Gollapinni, Bangalore (IN); Praveen Kumar Palisetti, Visakhapatnam (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,409

(22) Filed: Dec. 4, 2023

(65) Prior Publication Data
US 2024/0103886 A1 Mar. 28, 2024

Related U.S. Application Data

(63) Continuation of application No. 17/474,808, filed on Sep. 14, 2021, now Pat. No. 11,875,156.

(51) Int. Cl.
*G06F 9/445* (2018.01)
*G06F 9/30* (2018.01)
*G06F 9/54* (2006.01)

(52) U.S. Cl.
CPC ...... *G06F 9/44505* (2013.01); *G06F 9/30098* (2013.01); *G06F 9/546* (2013.01)

(58) Field of Classification Search
CPC ... G06F 9/44505; G06F 9/30098; G06F 9/546
USPC .......................................................... 713/105
See application file for complete search history.

(56) References Cited

U.S. PATENT DOCUMENTS

| | | | | |
|---|---|---|---|---|
| 5,555,351 A | * | 9/1996 | Craig | G06K 1/121 358/1.15 |
| 5,696,701 A | * | 12/1997 | Burgess | G06F 11/3495 709/224 |
| 6,314,088 B1 | * | 11/2001 | Yamano | H04L 41/0806 709/203 |
| 6,467,049 B1 | * | 10/2002 | Robins | G06F 21/31 714/13 |
| 6,760,733 B1 | * | 7/2004 | Komine | H04L 41/0233 707/999.102 |
| 6,954,799 B2 | * | 10/2005 | Lerner | G06F 21/41 709/227 |
| 7,062,545 B1 | * | 6/2006 | Donkin | G06F 9/4403 717/173 |
| 10,038,808 B1 | * | 7/2018 | Bhaskaran | H04N 1/00973 |

(Continued)

*Primary Examiner* — Paul R. Myers
(74) *Attorney, Agent, or Firm* — Sprinkle IP Law Group

(57) ABSTRACT

Embodiments of systems and methods for the centralized configuration of distributed heterogeneous services are disclosed herein. Embodiments of such systems and methods may be utilized to configure one or more service instances executing in an enterprise computing environment where each of the set of service instance is one of a set of service types that may be different. These services may, for example, be off-cloud services associated with a cloud based computing platform.

21 Claims, 4 Drawing Sheets

(56) References Cited

U.S. PATENT DOCUMENTS

| | | | |
|---|---|---|---|
| 11,875,156 B2* | 1/2024 | Kumar | G06F 9/542 |
| 2002/0078174 A1* | 6/2002 | Sim | H04L 67/1008 |
| | | | 709/219 |
| 2002/0129230 A1* | 9/2002 | Albright | H04L 41/12 |
| | | | 713/1 |
| 2007/0118841 A1* | 5/2007 | Driver | G06F 9/546 |
| | | | 719/314 |
| 2008/0147819 A1* | 6/2008 | Dettinger | G06F 9/546 |
| | | | 709/206 |
| 2009/0282133 A1* | 11/2009 | Walker | G16H 40/20 |
| | | | 709/221 |
| 2011/0145322 A1* | 6/2011 | Landry | H04L 41/0816 |
| | | | 719/331 |
| 2014/0344418 A1* | 11/2014 | Jones | H04L 41/0873 |
| | | | 709/220 |
| 2015/0370847 A1* | 12/2015 | Kondoh | G06F 17/40 |
| | | | 707/691 |
| 2018/0191706 A1* | 7/2018 | Hobson | G06F 21/60 |
| 2018/0329969 A1* | 11/2018 | Abrams | G06F 16/951 |
| 2019/0104398 A1* | 4/2019 | Owen | H04L 67/51 |
| 2019/0363934 A1* | 11/2019 | Li | H04L 41/0895 |
| 2020/0382578 A1* | 12/2020 | Lu | H04L 65/1069 |
| 2021/0092015 A1* | 3/2021 | Gardner | H04L 41/0893 |
| 2022/0078248 A1* | 3/2022 | Upton | H04L 65/1073 |

* cited by examiner

SYSTEM AND METHOD FOR CENTRALIZED CONFIGURATION OF DISTRIBUTED AND HETEROGENEOUS APPLICATIONS

RELATED APPLICATION(S)

This application is a continuation of, and claims a benefit of priority under 35 U.S.C. 120 of, U.S. patent application Ser. No. 17/474,808 filed Sep. 14, 2021, issued as U.S. Pat. No. 11,875,156, entitled "SYSTEM AND METHOD FOR CENTRALIZED CONFIGURATION OF DISTRIBUTED AND HETEROGENEOUS APPLICATIONS," which is hereby incorporated herein for all purposes.

TECHNICAL FIELD

This disclosure relates generally to the field of distributed networked computing environments. Specifically, the disclosure relates to systems and methods for the centralized configuration of applications within a distributed and networked computer environment. More specifically, embodiments as disclosed pertain to centralized configuration of distributed and heterogeneous applications within a networked computer environment, including those applications deployed off-cloud in association with a cloud based computing platform.

BACKGROUND

Large enterprises (e.g., any organization), including those with independent and geographically-dispersed units, commonly use many types of software applications and deploy multiple repositories to store data in support of the applications. Each of the applications can, additionally, have unique, evolving, configurations. These architectures and configurations may be quite complex.

A microcosm of this situations occurs with respect to many cloud deployed platforms. Despite the name, in many cases these cloud platforms may have associated application that are deployed "off-cloud". Such off-cloud deployments may be deployed on the premises of (e.g., the computing devices of) the enterprise itself or may otherwise be out of the direct control, supervision, or configuration of the operators of the cloud based computing platform. In particular, these different applications may be deployed off-cloud in a distributed networked computing environment. It is difficult to manage the configuration of such distributed, heterogeneous applications. In certain instances it may be desired to configure these distributed, heterogeneous applications, and in particular architectures it may be desired to configure these off-cloud applications for use with a cloud based platform. This is a complicated process, as such a configuration process may entail the individual configuration of multiple distributed heterogeneous applications which may, in turn, require the modification of complex configuration files or the stopping a reinitializing of such services. These processes are further complicated by the fact that the services that it is desired to configured may be off-cloud or under the control or management of a different entity (e.g., than the cloud based computing platform)

There is thus a need for systems and methods for the simple and efficient centralized configuration of these distributed, heterogeneous applications.

SUMMARY

To continue with the above discussion, it will be recalled that heterogeneous applications may be deployed across an enterprises computing environment. In some cases, these applications may be off-cloud applications or services (used interchangeably herein) for use with a cloud based computing platform. Furthermore, each service may have multiple instances of that service executing in the computing environment. These different instances may be utilized, for example, to accommodate load balancing, decrease response time, accommodate different types of users, or for other reasons. Accordingly, in many computing environments there are one or more (i.e., a set) service instances are executing in the enterprise computing environment, and each of the set of service instances is one of a set of service types.

In some cases, these types of services may be off-cloud services associated with a cloud based platform utilizing services deployed within the enterprises computing environment. For example, as discussed, large organizations with independent and geographically-dispersed units, commonly use many different types of software applications and deploy multiple repositories to store data in support of the applications. Each of the repositories may evolve to have unique configurations and may be subject to various records policies. Over time, records policies may become more complex as new data privacy regulations are introduced. As the risk profile for the repositories rises, there is an increasing need for centralized governance processes to prevent gaps and inconsistencies with respect to the enforcement of the records policies.

Systems which are implemented for this purpose (of centralized governance processes), which will be referred to herein as federated compliance systems, help organizations achieve centralized and automated management and oversight of records policies, and can enable visibility across multiple repositories of different types to provide transparency and defensibility of organizational information governance and reporting processes. Federated compliance systems may provide flexibility in the management of repositories that include both off-cloud repositories and cloud repositories. The use of such federated compliance system may entail the gathering of, and access to, such data off-cloud (e.g., the gathering and access of data within the enterprise environment). To facilitate this data gathering and access, a federated compliance system may utilize services deployed within the enterprise environment (e.g., off-cloud services).

As can be seen, there are many uses for different types of off-cloud services in association with service deployed on a cloud computing platform. In any event, the use of such services where there are multiple services (e.g., service types) in an enterprise computing environment where there are one or more service instances of each of those services executing may cause certain issues. One of the big issues with such an architecture is the configuration of such services. As discussed, there may be multiple instances of different types of services and these services may need to interact with certain authentication mechanisms in the enterprise environment or be configured with multiple repository details, or have a large degree of configurability for each service. Thus, it may be difficult to coordinate these services. Typically, each of these services requires individual configuration such that each service type may need to be individually configured and managed in a manually intensive manner (e.g., for example, using a manually configured individual configuration file for each service type or instance). Moreover, when such services are configured (e.g., when a configuration file for a service type is updated), to allow each service instance of that service type to be configured according to the updated configuration may require that each of the those service instances be restarted to allow the service instance to be reconfigured according to the updated configuration. This restarting of the services entails significant downtime.

Accordingly, there is a need to provide simple and efficient centralized configuration of these distributed, heterogeneous services within the enterprise environment (e.g., off-cloud services). And, in particular, simple and efficient centralized configuration of these services whereby services instances may be configured "on-the-fly" in real time without necessitating the restarting of the service instance or indeed any significant downtime for such service instance.

A similar and related problem is typically there is no "rolling-back" of such a configuration once it is updated. To illustrate, when a configuration file for a service type is altered, there is no record of what was altered in the confutation, what the previous configuration of that service type was, or who made such an alteration to the configuration of the service type. This situation is problematic, if there are any issues with the updated configuration there is no way to revert to a previous working configuration, to trace back previous configuration values or to otherwise perform auditing of such a configuration. As such, additional downtime of these services may be entailed to perform a configuration roll-back in cases where an updated configuration proves problematic.

Thus, it may additionally be desirable when configuring such services to provide versioning for the configurations of the services, whereby if any problems are encountered a previous configuration can be used to configure (e.g., re-configure) the services to, for example, reduce downtime.

To address these concerns pertaining to the configuration of services, among others, attention is directed to the embodiments of systems and methods for the centralized configuration of services are disclosed herein. Such systems may be utilized to configure one or more service instances executing in an enterprise computing environment where each of the set of service instance is one of a set of service types. These services may be off-cloud services associated with a cloud based computing platform. Embodiments of these systems and methods may include a data store that stores one or more configuration files. A configuration file may be associated with a particular service type of the set of service types. Additionally, in some embodiments, a configuration file may be a global configuration file associated with a configuration of all the service types of the set of service types.

In one embodiment, configuration files may be stored in a versioning system or document management or file control system (collectively a versioning system), such as Git or the like. In this manner, all (or a subset) of the previous versions of each configuration file may be maintained by the centralized configuration system. By maintaining these previous versions, a previous configuration may be used to roll-back the configuration of one or more (or all) service types using previous version of an associated configuration file, including the global configuration file.

A configuration server may provide a configuration interface that allows a user to provide or specify configuration for one or more of the service types. When the user changes such a configuration by specifying a value for a configuration parameter for a service type or all services, a corresponding change to the value for that configuration parameter may be made in the corresponding configuration file (e.g., the configuration file for the service type or the global configuration file). The configuration server can thus determine when a configuration file has changed and the service type associated with the changed configuration file (or that it is the global configuration that has changed).

Once the service type associated with the changed configuration file is determined (or all service types in the case where the global configuration has changed), the configuration server may determine if a service instance of that service is executing across the distributed enterprise computing environment or type. In cases where the configuration server determines that it is the global configuration file that has changed, the configuration server may determine if there are any executing service instances of any service type. If there are no instances of that service type (or no executing instances of any service type) the configuration server may take no further action with respect to the determined changes in the configuration file.

If, however, there is an executing instance of the service type associated with the changed configuration file (or there is any executing instance of any service type in the case where the global configuration file has changed), configuration data may be determined. Specifically, configuration data may be determined from the current version of the changed configuration file associated with that service type. The configuration server may then communicate the determined configuration data (e.g., the configuration parameters) to the (e.g., executing) instances of the service type associated with the changed configuration file (e.g., or all executing instances of all service types when the changed configuration is the global configuration).

To communicate this configuration data to the appropriate service instances of the service type (or all service instances) the configuration server may utilized a messaging service. The messaging service may maintain a messaging queue associated with each service type which has at least one executing instance. Thus, there may be a queue in the messaging server associated with each service type which has at least one executing service instance of that service type. According to embodiments then, the configuration server may act as a producer for the queues of the messaging service while each service instance of each service type may act as consumers for a queue associated with the service type of that service instance. In other words, a configuration server may place messages on the queues of the messaging service, while each service instance may obtain messages off the queue of the messaging service associated with its service type.

Accordingly, when the configuration server determines configuration data (e.g., configuration parameters) for a service type based on the configuration file for that service type, the configuration server may be adapted to cause a message including that configuration data for that service type to be placed on the queue of the messaging service for that service type or, when the configuration data is global configuration data, may cause a message including that configuration data to be placed on all queues of the messaging service for all service types.

As each service instance is a consumer for the configuration engine for an instance of a service type it is adapted to obtain the message including the configuration data from the queue associated with that service type and configure the associated service instance according to that configuration data (e.g., configure the service instance according to the configuration parameters included in the configuration data). This configuration may be accomplished for example, without restarting the service instance and without the service experiencing any significant downtime. As such, each executing service instance of that service type obtains the (e.g., same) message including the configuration data and configures each executing service instance of that service type according to the configuration data. In this manner, all executing instances of the service type may be reconfigured according to the change in the configuration of that service type without the need to restart or bring the services of that service type down for any extensive period of time. Additionally, in cases where the configuration data is global configuration data, where a message with the global configuration data may be placed on all queues for all service types, all instances of all service types may obtain such configuration data in the same manner. Thus, all instances of all service types may be configured according to this global configuration data without restarting any of those service instances or those service instances experiencing significant downtime.

As can be seen then, embodiments as disclosed herein may offer a number of significant advantages. Importantly, off-cloud service may be centrally managed in an individualized or global manner without needing to restart those services or those services experiencing significant downtime. As a similar advantage, as service types may be managed on an individualized and tailored basis, different service types may be managed differently in an individualized manner. Such individualized management may even include centralized management of different versions of the same service type. To illustrate, as the configuration of the instances of the service type may be based on a designation (name) of the service type, even if a service type is functionally identical (or only slightly different such as "Aggregator Service Production" versus "Aggregator Service Development"), instances of this service type may be separately managed and configured using a configuration named accordingly. For example, there may an "Aggregator Service Production" configuration file, a queue in the messaging service for "Aggregator Service Production" instances and service instances may separately register in the service registry and obtain configuration data from the associated "Aggregator Service Production" queue. Similarly, there may an "Aggregator Service Development" configuration file, a queue in the messaging service for "Aggregator Service Development" instances and service instances may separately register in the service registry and obtain configuration data from the associated "Aggregator Service Development." As a result, in this example, using embodiments as disclosed the configuration of instances of the Aggregator Service Production service may be managed differently than the configuration of instances of the Aggregator Service development service.

Similarly, embodiments may automatically refresh configuration information without causing any delay or without causing any significant downtime while avoiding any user intervention required to refresh the services. Moreover, configuration of a particular service type or all of the service types used by an enterprise environment can be done at a centralized location and reflected to all, or a subset of, services. Additionally, embodiment may maintain the history of configurations and can rollback to a previous version in case of any failures in a latest configuration. Embodiments may also provide enhanced security because even in the case of unauthorized access to the configuration files may not be granted.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
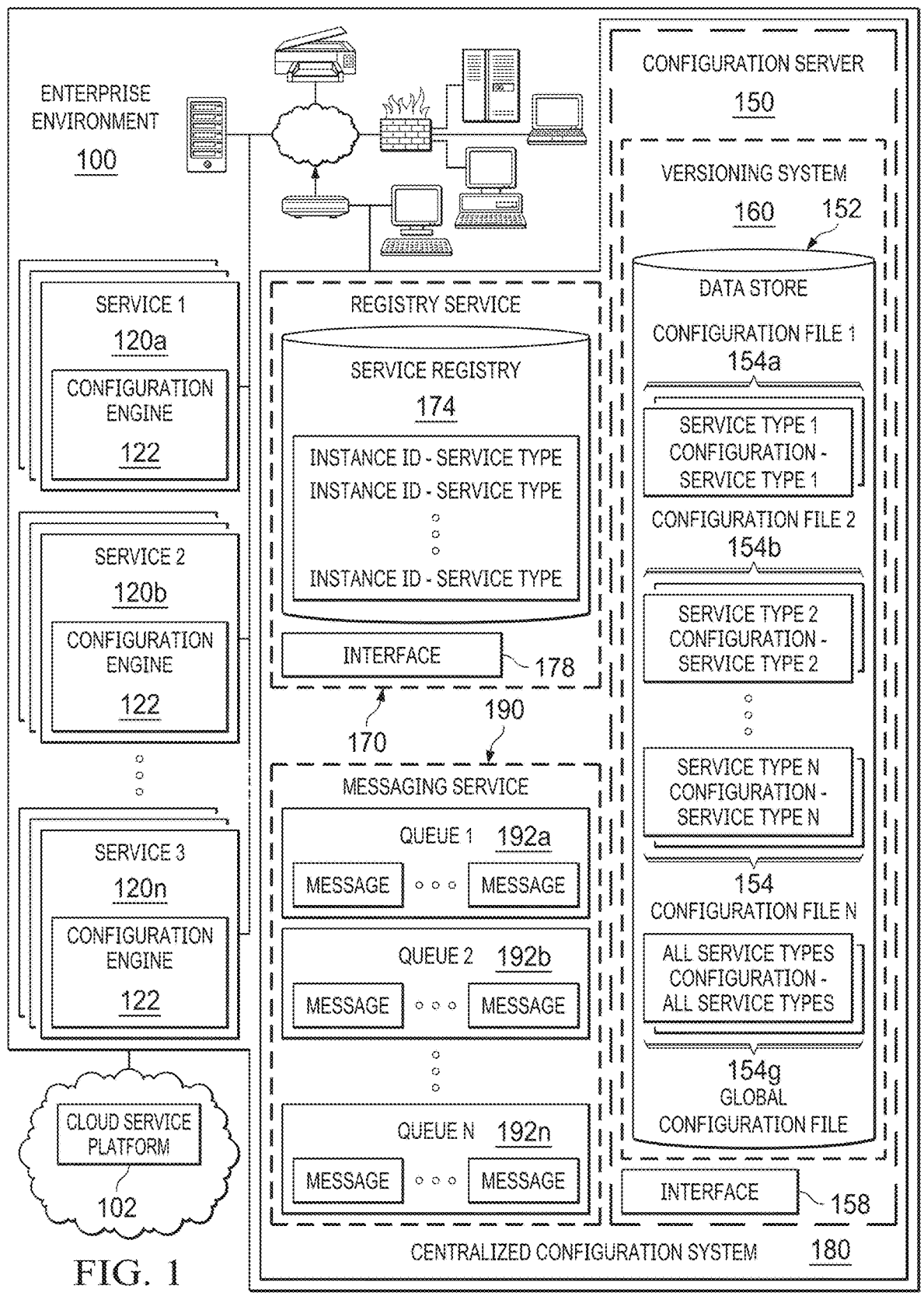
FIG. 1 is a block diagram of a distributed networked computer environment including one embodiment of a centralized configuration system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more details regarding the specific embodiments disclosed herein, some context may be helpful. As discussed, large enterprises (e.g., any organization), including those with independent and geographically-dispersed units, commonly use many types of software applications (services) and deploy multiple repositories to store data in support of these services. Each of the applications can, additionally, have unique, evolving, configurations. These architectures and configurations may be quite complex.

A microcosm of this situation occurs with respect to many cloud deployed platforms. Despite the name, in many cases these cloud platforms may have associated services that are deployed off-cloud. Such off-cloud deployments may be deployed on within an enterprise's computing environment or may otherwise be out of the direct control, supervision, or configuration of the operators of the cloud based computing platform.

It may be desired to configure these distributed, heterogeneous services, and in particular architectures it may be desired to configure these off-cloud services for use with a cloud based platform. This is a complicated process, as such a configuration process may entail the individual configuration of multiple distributed heterogeneous services which may, in turn, require the modification of complex configuration files or the stopping a reinitializing of such services. An example of such a configuration file is depicted in Appendix A. These processes are further complicated by the fact that the services that it is desired to configured may be off-cloud or under the control or management of a different entity (e.g., than the cloud based computing platform)

There is thus a need for systems and methods for the simple and efficient centralized configuration of these distributed, heterogeneous applications (services). To illustrate in more detail, the use of such services where there are multiple services (e.g., service types) in an enterprise computing environment where there are one or more service instances of each of those services executing may cause certain issues related to the configuration of such services. These multiple instances of different types of services and these services may need to interact with certain authentication mechanisms in the enterprise environment or be configured with multiple repository details, or have a large degree of configurability for each service. Thus, it may be difficult to coordinate these services. Typically, each of these services requires individual configuration such that each service type may need to be individually configured and managed in a manually intensive manner (e.g., for example, using a manually managed individual configuration file for each service type or even service instance). Moreover, when such services are configured (e.g., when a configuration file for a service type is updated), to allow each service instance of that service type to be configured according to the updated configuration may require that each of those service instances be restarted to allow the service instance to be reconfigured according to the updated configuration. This restarting of the services entails significant downtime.

Accordingly, there is a need to provide simple and efficient centralized configuration of these distributed, heterogeneous services within the enterprise environment (e.g., off-cloud services). And, in particular, simple and efficient centralized configuration of these services whereby services instances may be configured "on-the-fly" in real time without necessitating the restarting of the service instance or indeed any significant downtime for such service instance.

A similar and related problem is typically there is no "rolling-back" of such a configuration once it is updated. To illustrate, when a configuration file for a service type is altered, there is no record of what was altered in the confutation, what the previous configuration of that service type was, or who made such an alteration to the configuration of the service type. This situation is problematic, if there are any issues with the updated configuration there is no way to revert to a previous working configuration, to trace back previous configuration values or to otherwise perform auditing of such a configuration. As such, additional downtime of these services may be entailed to perform a configuration roll-back in cases where an updated configuration proves problematic.

Thus, it may additionally be desirable when configuring such services to provide versioning for the configurations of the services, whereby if any problems are encountered a previous configuration can be used to configure (e.g., re-configure) the services to, for example, reduce downtime.

Embodiments of a centralized configuration system as disclosed herein may address these concerns among others and provide other additional advantages as will be understood. Referring to FIG. 1 then, one embodiment of just such a centralized configuration system deployed in association with an enterprise environment is depicted. Enterprise environment 100 may include a physically or logically distributed networked computing platform Enterprise environment 100 may include a set of services 120 where each service 120 may have multiple instances of that service 120 executing in the enterprise computing environment 100. These different instances of services may be utilized, for example, to accommodate load balancing, decrease response time, accommodate different types of users, or for other reasons. Accordingly, in many computing environments there are one or more (i.e., a set) service instances are executing in the enterprise computing environment 100, and each of the set of service instances is one of a set of service types.

In some cases, these types of services 120 may be off-cloud services associated with a cloud based platform 102 that utilizes services deployed within the enterprises computing environment. For example, as discussed, large enterprises with independent and geographically-dispersed units, commonly use many different types of software applications and deploy multiple repositories to store data in support of the applications. Each of the repositories may evolve to have unique configurations and may be subject to various records policies. Over time, records policies may become more complex as new data privacy regulations are introduced. As the risk profile for the repositories rises, there is an increasing need for centralized governance processes to prevent gaps and inconsistencies with respect to the enforcement of the records policies.

Systems which are implemented for this purpose (of centralized governance processes), which will be referred to herein as federated compliance systems, help organizations achieve centralized and automated management and oversight of records policies, and can enable visibility across multiple repositories of different types to provide transparency and defensibility of organizational information governance and reporting processes. Federated compliance systems may provide flexibility in the management of repositories that include both off-cloud repositories and cloud repositories. While records policies may be enacted locally, federated compliance systems can allow operational control of the different repositories to be centralized, thereby reducing scalability issues. These federated compliance systems thus allow the gathering and presentation of data regarding the data and services utilized by the enterprise.

Such federated compliance systems may be implemented in a cloud services platform 102 and may be implemented as federated compliance services. However, regardless of where the federated compliance system is implemented, the use of such federated compliance system may entail the gathering of, and access to, such data off-cloud (e.g., the gathering and access of data within the enterprise environment). To facilitate this data gathering and access, a federated compliance system may utilize services 120 deployed within the enterprise environment (e.g., off-cloud services with respect to cloud service platform 102).

As but one example, a federated compliance system may utilize an off-cloud aggregator service and an authentication proxy service deployed in the enterprise computing environment 100. An authentication proxy service can, for example, serve an authentication mechanism for the federated system and employ an authentication mechanism so only authorized users (e.g., an authorized federated compliance system) may access various related services within the enterprise and additionally that all services off-cloud may interact with the on-cloud service through such an authentication proxy service. Thus, all access by the federated compliance system may go through such an authentication proxy service.

An aggregator service may be used by the federated compliance system to retrieve and store data from systems or repositories that store an organization's data for reporting, so that such data can be quickly and easily accessed by a user of the federated compliance system. Such an aggregator service may thus periodically search or retrieve data from the systems, applications and repositories in the enterprise computing environment and store such gathered data.

Accordingly, a user may utilize an interface (e.g., a report interface of the like) of a federated compliance service (e.g., an on-cloud federated compliance service deployed in a cloud services platform 102) to request one or more desired reports or other data. The federated compliance cloud service in cloud services platform 102 may then retrieve this data (e.g., for the requested report or otherwise). The federated compliance service forwards the request to the off-cloud authentication proxy service (e.g., a service 120) in the enterprise environment 100. The authentication proxy service can then utilize the aggregator service (e.g., a service 120) in the enterprise environment 100 to retrieve or otherwise access or obtain the desired data. The aggregator service then returns the retrieved data to the authentication proxy service. The off-cloud authentication proxy service (e.g., a service 120) returns this data to the on-cloud federated compliance service which returns the data through the interface. For example, the federated compliance service in cloud service platform 102 generates requested reports using the received data and provides the reports to the user.

As can be seen, there are many uses for different types of off-cloud services (e.g., implemented as a service 120) in association with a service deployed on a cloud computing platform 102. As such, it will be understood that while embodiments as disclosed herein may be discussed with respect to a federated compliance service and associated off-cloud services deployed in an enterprise environment, and may be usefully used in such a context, other embodiments may be implemented in other contexts, all of which are fully contemplated herein.

In any event, the use of such services 120 where there are multiple types of these services (e.g., service types) in an enterprise computing environment 100 where there are one or more service instances of each of those services 120 executing may cause certain issues. One of the big issues with such an architecture is the configuration of such services 120. As discussed, there may be multiple instances of different types of services 120 and these services 120 may need to interact with certain authentication mechanisms in the enterprise environment 100 or be configured with multiple repository details, or have a large degree of configurability for each service 120. Thus, it may be difficult to coordinate these services 120.

Centralized configuration system 180 may be adapted to facilitate the centralized configuration of services 120. Specifically, centralized configuration system 180 may be adapted to configure one or more service instances executing in enterprise computing environment 100 where each of the set of service instances is one of a set of service types for the service 120. These services 120 may be off-cloud services associated with cloud based computing platform 102. Embodiments of centralized configuration system 180 may include a configuration server 150 that includes a data store 152 that stores one or more configuration files 154. A configuration file 154 may be associated with a particular service type of the set of service types. For example, configuration file 154*a* may be associated with a service type of services 120*a*, configuration file 154*b* may be associated with a service type of services 120*b*. Additionally, in some embodiments, a configuration file 154 may be a global configuration file 154*g* associated with a configuration of all the service types of the set of service types. In other words, a configuration file 154 for a particular service type may include configuration data specific to that particular service type. Such configuration data may include, for example, key value pairs where the key is a configuration parameter for that service type and the value is the value that it is desired for that configuration parameter to have for that service type. The special configuration file 154*g* referred to as a global configuration file may include global configuration data for all service types. Here, then, global configuration data may include, for example, key value pairs where the key is a configuration parameter for all service types and the value is the value that it is desired for that configuration parameter to have for all service types.

In some instances, these configuration files 154 may be associated with the service type by associating the configuration file 154 with an identifier that identifies the configuration file with a particular service type or identifies the configuration file 154 as the global configuration file 154*g*. This identifier may, for example, be a name for the configuration file 154 where the name for the file 154 is the identifier of the service type or is an identifier of the global configuration file 154*g* (e.g., the global configuration file may be named "Global Configuration File", if service 120*a* is an aggregator service, the configuration file 154*a* for an aggregator service service type may be named "Aggregator Service", etc.).

In one embodiment, configuration files 154 may be stored in a versioning system or document management or file control system (collectively a versioning system 160), such as Git or the like. In this manner all (or a subset) of the previous versions of each configuration file 154 may be maintained by the centralized configuration system 180. By maintaining these previous versions of configuration files 154, a previous configuration may be used to roll-back the configuration of one or more (or all) service types using previous version of an associated configuration file 154, including the global configuration file 154*g*.

In embodiments configuration server 150 may provide a configuration interface 158 that allows a user to provide or specify configuration for one or more of the service types. In certain embodiments an architecture may be utilized whereby the configuration server 150 is itself off-cloud (e.g., deployed in an enterprise environment 100) and used to manage the centralized configuration of off-cloud services 120 utilized with cloud based computing platform 102. Thus, a user such as an admin of an enterprise computing environment 100 or the like may access the interface 158 of the configuration server 150 to change the configuration of one or more service types deployed in the off-cloud enterprise environment 100.

When a user accesses the interface 158 of the configuration server 150, the configuration server 150 may access the configuration files 154 for each of the service types and the global configuration file 154*g* in the data store. If the configuration files 154 are stored utilizing a versioning system 160 the most current version of each of the configuration files 154 may be accessed. The current configurations for a desired service type, or the current global configuration, may be displayed to the user through the interface 158 by reference to the corresponding configuration file 154. Additionally, the interface 158 may allow the user to alter, update, modify, add, create, or change (collectively change) configuration values for a service type or the global configuration. The interface 158, for example, may allow a user to access a portion of the interface (e.g., a page) associated with each service type or with the global configuration and allow the user to change the configuration parameters for the associated service type or global configuration using the associated portion of the interface 158.

When the user changes such a configuration by specifying a value for a configuration parameter for a service type or for all service types, a corresponding change to the value for that configuration parameter may be made in the corresponding configuration file 154 (e.g., the configuration file for the service type or the global configuration file). For example, if the configuration files 154 are stored utilizing a versioning system 160, a new version of the corresponding configuration file 154 may be created by editing the corresponding configuration file 154 according to the change and committing the changed configuration file 154 in the versioning system 160.

The configuration server 150 can thus determine when a configuration file 154 has changed. Specifically, in one embodiment, the configuration server 154 may subscribe or otherwise be notified of commits to the configuration files 154 from the versioning system 160 (e.g., may subscribe or be notified of commits to a folder storing the configuration files 1454, etc.) in which such configuration files 154 are stored. For example, the configuration server 150 may be configured with a location of the configuration files 154 in the versioning system 160. The configuration server 150 can then determine the service type of the set of service types that are associated with the configuration file 154 that changed, or may determine that it is the global configuration file 154g that has changed. This determination may be made, for example, by reference to the name of the configuration file 154 which was determined has changed. For example, if the name of the file 154 to which a notification of a commit was received is "Aggregator Service" it can be determined that the configuration for the aggregator service service type has changed. If the name of the file for which a notification of a commit was received is "Global Configuration" it can be determined that the global configuration for all the service types has changed.

Once the service type associated with the changed configuration file 154 is determined (or all service types in the case where the global configuration has changed), it can be determined if there are instances of that service type (or any service type in the case of the global configuration) currently executing in the environment 100 (e.g., currently deployed as a service 120 in the off-cloud distributed network enterprise computing environment 100). Embodiments may utilize a service registry to make such a determination. In particular, embodiments of the centralized configuration system 180 may include a registry service 170 that includes an interface 178 and a service registry 174 that includes a set of entries, where each entry is associated with an instance of a service 120 and identifies the service instance and the service type for that instance. The identifier of the service type may, for example, be an identifier that identifies the particular service type. This identifier may be, for example, the name of the service type. In one embodiment, this identifier for the service type may be the same identifier used to name the configuration file 154 associated with that service type (e.g., the identifier for the service type for an aggregator service may be "Aggregator Service", etc.).

Each service instance 120 of each service type may include a configuration engine 122. When the service instance 120 of the service type starts (e.g., is created or instantiated), the configuration engine 122 of the service instance 120 may register with the registry service 170 utilizing the interface 178 provided by the registry service 170. For example, the configuration engine 122 of an instance of a service type may send a request or notification to the interface 178 of the registry service 170 identifying its service type with an identifier of the service type and may also include an identifier associated with the instance itself (e.g., uniquely identifying the instance of that service type). For example, the identifier of the service type sent to the interface 178 of the registry service 170 may be the name of the service type. In one embodiment, this identifier for the service type may be the same identifier used to name the configuration file 154 associated with that service type (e.g., the identifier for the service type for an aggregator service may be "Aggregator Service", etc.). The registry service 170 is adapted to create (or update) a corresponding entry in the service registry 174 for that service instance 120 when the (configuration engine 122 of the) service instance 120 registers with the registry service.

In this manner, in one embodiment, the service registry 174 may include entries for each instance of a service type, where each entry may identify the associated service type by the same identifier used to name the configuration file 154 for that service type and which the configuration server 150 may use to determine which service type's configuration has been changed. This service registry 174 may be maintained in a current state by removing stale or entries otherwise corresponding to instances that are no longer executing. To remove such entries a heartbeat message from the configuration engine 122 of each service instance 120 to the registry service 170 may be used (such that a corresponding entry in service registry 174 is removed if a heartbeat message is not received for a certain amount of time) or a deregistration request to the interface 178 of the registry service 170 may be sent by configuration engine 122 of service instance 120 when a service instance exits (e.g., correctly).

Thus, when a configuration server 150 determine that a configuration file 154 has changed and the service type associated with the configuration file 150 that changed (or that it is the global configuration file 154g that has changed), the configuration server 150 may determine if a service instance 120 of that service type is executing across the distributed enterprise computing environment 100 (e.g., the off-cloud computing environment). In cases where the configuration server 150 determines that it is the global configuration file 154g that has changed, the configuration server 150 may determine if there are any executing service instances 120 of any service type. Such a determination (e.g., as to if a particular instance 120 of a particular service type associated with a changed configuration file is executing, or if any instance 120 of any service type is executing in the case a change to the global configuration file 154g is determined) may be made using the registry service 170. Specifically, the configuration server 150 may send a request to the interface 178 of the registry service 170 identifying a service type, or specifying any or all service types. Such an identifier for a service type may be the same identifier used to name the configuration file 154 associated with that service type (e.g., the identifier for the service type for an aggregator service may be "Aggregator Service" which may be the name of the configuration file for the aggregator service service type). Thus, when the configuration server 150 determines a configuration file 154 has changed, the name of that configuration file '54 may be utilized in a request to the registry service '70 to determine if there are any instances 120 of that service type currently executing.

In response to receiving such a request for identification of an executing instance of a service type, the registry service 170 may access the service registry 174 and determine if there is an entry in the service registry 174 corresponding to the service type identified in the request (or, in the case where the request specifies any or all service types may determine if there is any entry for any service instance in the service registry 174). The registry service 170 can then return a response indicating if there are any service instances 120 of the identified service type currently executing (or if there are any instances 120 of any service executing). Additionally, in some embodiments, the registry service 170 may return an identification of the service types executing (e.g., by identifier), a count of the number of the instances executing, or other data that is included, or may be determined from, the service registry 174.

The configuration server 150 may receive a response to its request for identification of any executing instances of the determined service type associated with the changed configuration file 154, where the response indicates if there is an executing instance 120 of that service type (or if there are any instances of any service type executing in cases where the global configuration file 154g has changed). If there are no instances 120 of that service type (or no executing instances 120 of any service type) the configuration server 150 may take no further action with respect to the determined changes in the configuration file 154.

If, however, there is an executing instance 120 of the service type associated with the changed configuration file 154 (or there is any executing instance of any service type in the case where the global configuration file 154g has changed), configuration data may be determined. Specifically, configuration data may be determined from the current version of the changed configuration file 154 associated with that service type. For example, when it is determined that the configuration file named "Aggregator Service" has been changed, and it is determined that there are executing instances 120 of the aggregator service service type, configuration data may be determined using the current version of the configuration file 154 named "Aggregator Service". This configuration data may be determined based on the change to the current version of the configuration file 154. For example, this change can be a difference between a previous version of the configuration file 154 in the versioning system 160 and a current version of the configuration file 154 in the versioning system 160. Thus, for example, the configuration data may be one or more key value pairs or other types of configuration parameters that were changed in the current version of the associated configuration file 154 (e.g., in relation to a previous version of the associated configuration file 154).

The configuration server 150 may then communicate the determined configuration data (e.g., the configuration parameters) to the (e.g., executing) instances 120 of the service type associated with the changed configuration file 154 (e.g., or all executing instances 120 of all service types when the changed configuration is the global configuration). To communicate this configuration data to the appropriate service instances 120 of the service type (or all service instances) the configuration server 150 may utilize a messaging service 190.

In one embodiment, the messaging service 190 may include a messaging broker or event streaming platform such as Kafka, RabbitMQ. The messaging service 190 may maintain a messaging queue 192 associated with each service type which has at least one executing instance 120. Thus, there may be a queue 192 in the messaging service 190 associated with each service type which has at least one executing service instance 120 of that service type. For example, queue 192a may be associated with service instances 120a of a first service type (e.g., also associated with configuration file 154a), queue 192b may be associated with service instances 120b of a first service type (e.g., also associated with configuration file 154b), etc.

In one embodiment, these queues 192 may be created or deprecated (e.g., removed) based on the instances 120 of the service types registered in the service registry 174. In one embodiment, at some time interval, or when notified by the registry service 170, the messaging service 190 may use the service registry 184 of the registry service 170 to determine which service types currently have executing instances 120 (e.g., by sending a request to the registry service 170). The messaging service 190 may receive an identification for each executing service type (e.g., the same name of that service type as used to register with service registry 174 by the configuration engine 122 of the instance of the service type). The messaging service 190 can then create a message queue 192 for each identified service type for which a message queue 192 does not currently exist. Thus, there is a queue 192 in the messaging service 190 for each service type which currently has at least one executing instance 120. Moreover, there may be a congruence between the name of the configuration file 154 for a service type, the identifier for the service type as used in the service registry 174 (e.g., for instances of that service type) and the identification of the messaging queue 192 used for that service type in the messaging service.

According to embodiments then, the configuration server 150 may act as a producer for the queues 192 of the messaging service 190 while the configuration engines 122 of each service instance 120 of each service type may act as consumers for a queue 192 associated with the service type of that service instance 120. In other words, configuration server 150 may place messages on the queues 192 of the messaging service 190, while the configuration engine 122 of each service instance 120 may obtain messages off the queue 192 of the messaging service 190 associated with its service type. For example, an instance 120 of the aggregator service may be a consumer of an aggregator service queue 192 in the messaging service 190 and may obtain (e.g., receive) messages off the aggregator service queue 192 of the messaging service 190, where those messages may have been placed on the aggregator service queue 192 by the configuration server 150.

Accordingly, when the configuration server 150 determines configuration data (e.g., configuration parameters) for a service type based on the configuration file 154 for that service type, the configuration server 150 may be adapted to cause a message including that configuration data for that service type to be placed on the queue 192 of the messaging service 190 for that service type or, when the configuration data is global configuration data, may cause a message including that configuration data to be placed on all queues 192 of the messaging service 190 for all service types. For example, the configuration service may send a request to create a message (or the configuration server may create the message and send it in the request) with the confirmation data. The request may also identify the service type associated with the message (e.g., using the identifier for the service type, and request that the message with the configuration data be placed on the queue 192 associated with the identified service type. For example, a request with configuration data for an aggregator service may identify the service type as "Aggregator Service" and request to place a message with that configuration data for the aggregator service on the queue 192 for the aggregator service. In the case where the configuration data is global configuration data, the request to create or place the message including the configuration data may indicate that message is intended for all service types. In such cases, the messaging service 190 may place the message on all extant queues 192 (e.g., associated with all service types) in the messaging service 190.

As the configuration engine 122 of each service instance 120 is a consumer for the queue 192 associated with the service type of that service instance, the configuration engine 122 for an instance 120 of a service type is adapted to obtain the message including the configuration data from the queue 192 associated with that service type, and configure the associated service instance 120 according to that configuration data (e.g., configure the service instance 120 according to the configuration parameters included in the configuration data). The configuration engine 122 may, for example, be adapted to make such configuration alterations without restarting the service instance 120 and without the service experiencing any significant downtime. As such, the configuration engine 122 of each executing service instance 120 of that service type obtains the (e.g., same) message including the configuration data and configures that executing service instance 120 of that service type according to the configuration data. In this manner, all executing instances 120 of the service type may be reconfigured according to the change in the configuration of that service type without the need to restart or bring the services of that service type down for any extensive period of time. Additionally, in cases where the configuration data is global configuration data, where a message with the global configuration data may be placed on all queues 192 for all service types, the configuration engine 122 of all instances of all service types may obtain such configuration data in the same manner. Thus, all instances 120 of all service types may be configured according to this global configuration data without restarting any of those service instances 120 or those service instance 120 experiencing significant downtime.

Figure 2:
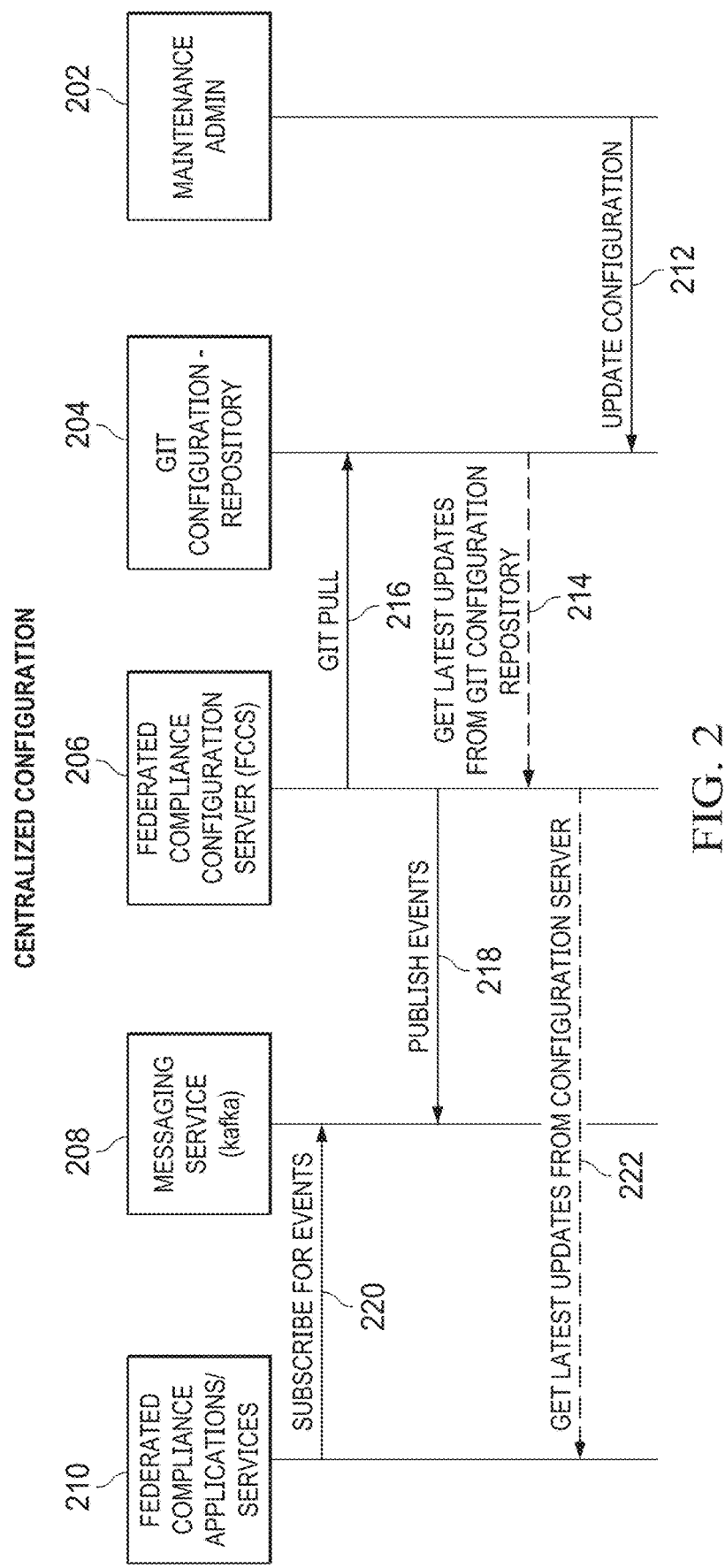
FIG. 2 is a diagram of centralized configuration management of distributed services according to one embodiment.

Moving to FIG. 2, a flow diagram depicting a flow of embodiments of centralized configuration of distributed heterogeneous services is depicted. In the embodiments depicted, a centralized configuration system may be used to configure off-cloud federated compliance applications (also referred to as services) 210 used with a cloud based federated compliance system. Thus, the centralized configuration system may include a configuration server 206 (referred to as a Federated Compliance Configuration Server in this context), a messaging service 208 (e.g., in this embodiment employing Kafka), and a data store (repository) 204 storing configuration files (in this embodiment the repository is part of a Git versioning system). Messaging service 208 may maintain a queue or other data structure or notification mechanism (collectively a queue) associated with the service type of off-cloud federated compliance service 210. In turn, the federated compliance service 210 may subscribe 220 to the messaging service 208 for messages (events) related to the service type of that federated compliance service 210 (e.g., to be notified when a message is placed on the queue associated with that service type).

When a user 202 (e.g., a configuration or other service maintenance administrator) updates 212 the configuration of the service type the federated compliance service 210 (or a global configuration) such that the corresponding configuration file (e.g., for that federated compliance service 210 or a global configuration file) is update in the data store (repository) 204, the federated compliance configuration server 206 may determine such a change to the configuration for the federated compliance service 210. This change may be determined in response to an update 214 (e.g., a notification of a commit) received from the repository (or versioning system including the repository) related to a configuration file associated with the service type of the federated compliance service 210. The federated compliance configuration server 206 can then determine configuration data based on the changed configuration (e.g., the configuration file). Specifically, the federated compliance configuration server 206 may obtain 216 (e.g., using a Git-pull or the like) the latest version of the configuration file and, in one embodiment, other related data such as the previous version of the configuration file.

The federated compliance configuration server 206 can then use this data to determine configuration data (e.g., changed configuration parameters) related to the configuration change 214. The federated compliance configuration server 206 can then place 218 an event with that configuration data (e.g., changed configuration parameters) on the queue of the messaging service 208 associated with the service type of the federated compliance service 210 (e.g., publish the event to the queue). As the federated compliance service 210 is subscribed to those events at the messaging service 210, the federated compliance service 210 may obtain the event and determine that configuration data (e.g., configuration parameters) from the obtained event and configure itself (the federated compliance service 210) accordingly, without restarting. In this manner, the federated compliance service 210 gets the latest updates to its configuration 222 from the federated compliance configuration server 206 and can configure itself based on these updates.

Figure 3:
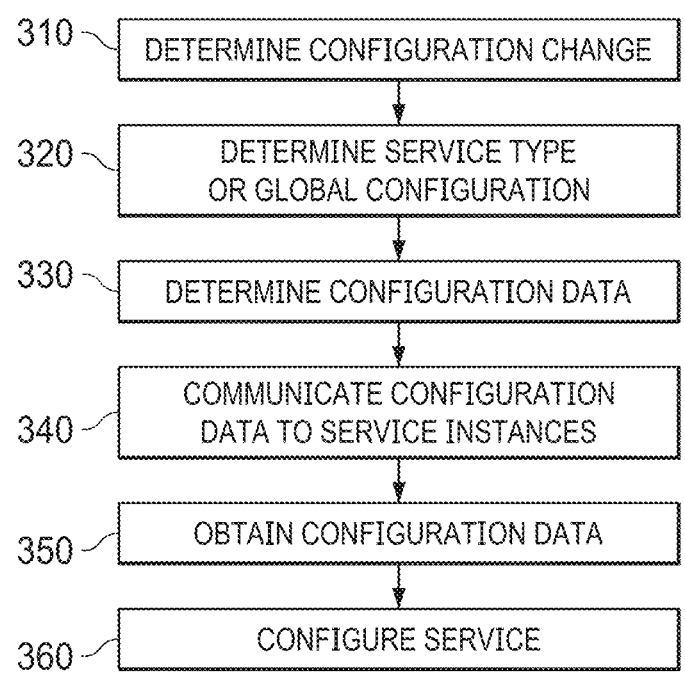
FIG. 3 is a flow diagram of one embodiment of centralized configuration management.

FIG. 3 depicts a flow diagram for the centralized configuration of distributed heterogeneous service in an enterprise environment. Such a method may be employed by a centralized configuration system used in an enterprise environment that includes a set of services, where each service may have multiple instances of that service executing in the enterprise computing environment. These types of services may be off-cloud services associated with a cloud based platform that utilizes services deployed within the enterprises computing environment.

Initially then, it can be determined that a change has occurred to a configuration (STEP 310) associated with one or more of the service types. Specifically, embodiments may store one or more configuration files. A configuration file may be associated with a service type of the set of service types and include configuration data specific to that particular service type. Such configuration data may include, for example, key value pairs where the key is a configuration parameter for that service type and the value is the value that it is desired for that configuration parameter to have for that service type. A special global configuration file may include global configuration data for all service types. These configuration files may be associated with the service type by associating the configuration file with an identifier that identifies the configuration file with a particular service type or identifies the configuration file as the global configuration file. These configuration files may be stored in a versioning system. In this manner all (or a subset) of the previous versions of each configuration file may be maintained.

In embodiments, a user may change configuration values for a service type or the global configuration. When the user changes such a configuration by specifying a value for a configuration parameter for a service type or for all service types, a corresponding change to the value for that configuration parameter may be made in the corresponding configuration file (e.g., the configuration file for the service type or the global configuration file). For example, if the configuration files are stored utilizing a versioning system a new version of the corresponding configuration file may be created by editing the corresponding configuration file according to the change and committing the changed configuration file in the versioning system.

It can thus be determined when a configuration has changed. Specifically, in one embodiment, a determination may be made based on the commits to the configuration files as determined from the versioning system in which such configuration files are stored. For example, a configuration may indicate a location of the configuration files in the versioning system and receive a commit to that location (e.g., for a file) to make a determination that the configuration for that service type has changed.

The service type of the set of service types that are associated with the configuration file that changed can then be determined, or it can be determined that it is the global configuration file that has changed (STEP 320). This determination may be made, for example, by reference to the identifier (e.g., name) of the configuration file which it was determined has changed.

Once the service type associated with the changed configuration file is determined (or all service types in the case where the global configuration has changed), it can be determined if there are instances of that service type (or any instance of any service type in the case of the global configuration) currently executing in the environment. Embodiments may utilize a service registry to make such a determination as discussed herein. In particular, embodiments may include a registry service that includes a service registry that includes a set of entries, where each entry is associated with an instance of a service type and identifies the service instance and the service type for that instance. The identifier of the service type may, for example, be an identifier that identifies the particular service type. Thus, the service registry may be utilized to determine if there is an executing instance of a service type.

When there is an executing instance of the service type associated with the changed configuration file (or there is any executing instance of any service type in the case where the global configuration file has changed), configuration data may be determined (STEP 330). Specifically, configuration data may be determined from the current version of the changed configuration file associated with that service type. This configuration data may be determined based on the change to the current version of the configuration file. For example, this change can be a difference between a previous version of the configuration file in the versioning system and a current version of the configuration file in the versioning system.

The determined configuration data (e.g., the configuration parameters) can then be communicated to the (e.g., executing) instances of the service type associated with the changed configuration file (e.g., or all executing instances of all service types when the changed configuration is the global configuration) (STEP 340). To communicate this configuration data to the appropriate service instances of the service type (or all service instances) a messaging service may be utilized. In one embodiment, the messaging service may maintain a messaging queue associated with each service type which has at least one executing instance. Thus, there may be a queue in the messaging service associated with each service type which has at least one executing service instance of that service type. Accordingly, when the configuration data (e.g., configuration parameters) for a service type is determined a message including that configuration data for that service type may be placed on the queue of the messaging service for that service type or, when the configuration data is global configuration data, a message including that configuration data may be placed on all queues of the messaging service for all service types.

Each service instance of the service type (or all service instances of all service types) may obtain the configuration data (STEP 350) and configure itself accordingly based on the configuration data (STEP 360). Specifically, each service instance may be a consumer for the queue associated with the service type of that service instance. The service instance can thus obtain the message including the configuration data from the queue associated with that service type, and configure the associated service instance according to that configuration data (e.g., configure the service instance according to the configuration parameters included in the configuration data). The service instance may be adapted to make such configuration alterations without restarting the service instance and without the service experiencing any significant downtime. As such, each executing service instance of that service type obtains the (e.g., same) message including the configuration data and configures that executing service instance of that service type according to the configuration data. In this manner, all executing instances of the service type may be reconfigured according to the change in the configuration of that service type without the need to restart or bring the services of that service type down for any extensive period of time. Additionally, in cases where the configuration data is global configuration data, where a message with the global configuration data may be placed on all queues for all service types, all instances of all service types may obtain such configuration data in the same manner. Thus, all instances of all service types may be configured according to this global configuration data without restarting any of those service instances or those service instances experiencing significant downtime.

Figure 4:
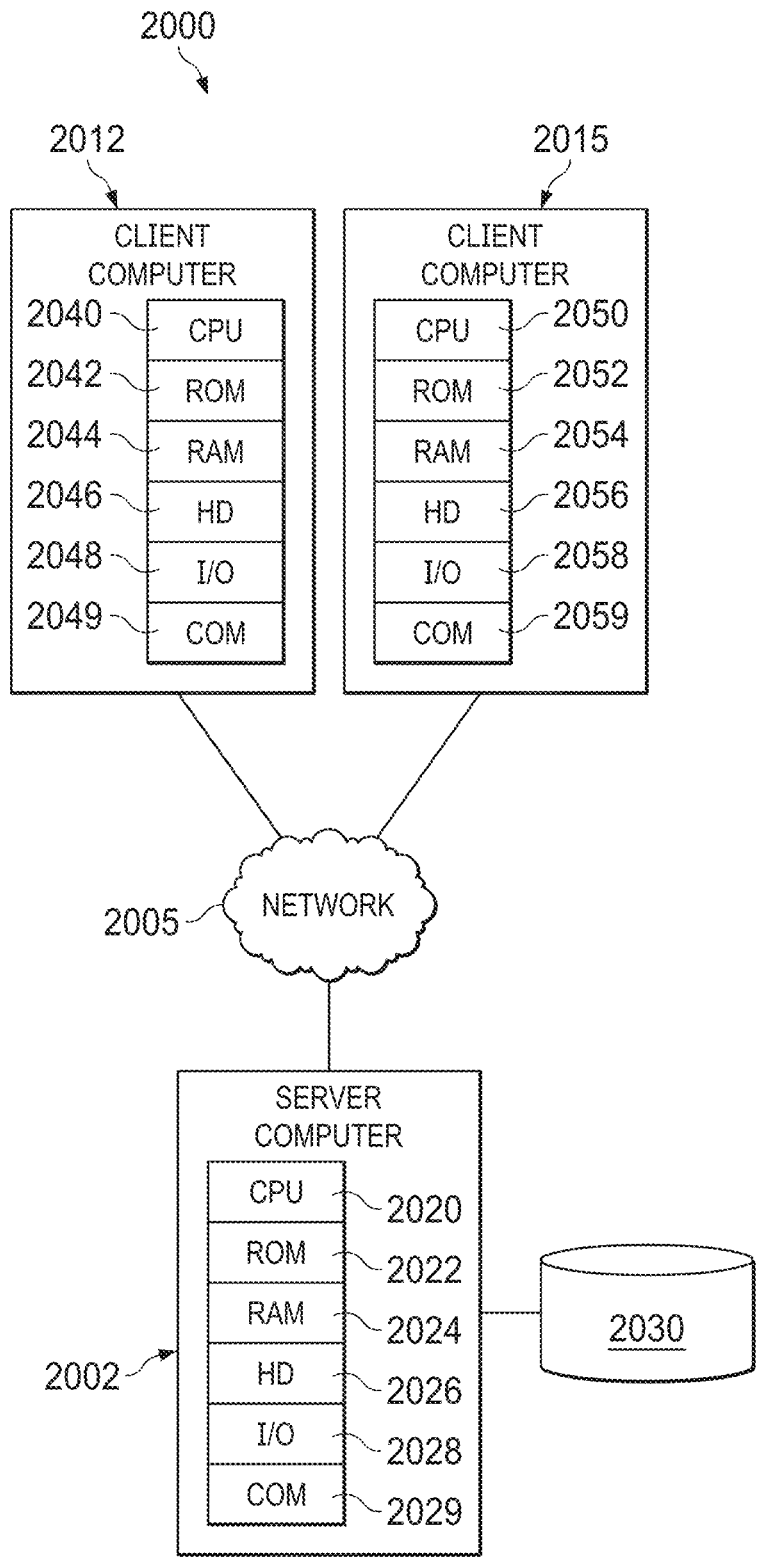
FIG. 4 is a diagrammatic representation of a distributed network computing environment.

FIG. 4 depicts a diagrammatic representation of a distributed network computing environment where embodiments disclosed herein can be implemented. In the example illustrated, network computing environment 2000 includes network 2005 that can be bi-directionally coupled to client computers 2012, 2015 and server computer 2002. Network 2005 may represent a combination of wired and wireless networks that network computing environment 2000 may utilize for various types of network communications known to those skilled in the art. For the purpose of illustration, a single system is shown for each of computer 2002, 2012, and 2015. However, each of computers 2002, 2012 and 2015 may comprise a plurality of computers (not shown) interconnected to each other over network 2005. For example, a plurality of computers 2002, a plurality of computers 2012 and a plurality of computers 2015 may be coupled to network 2005. Computers 2012, 2015 may include data processing systems for communicating with computer 2002.

Server computer 2002 can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005.

Computer 2002 may include one or more backend systems configured for providing a variety of services to computers 2012, 2015 over network 2005. These services may utilize data stored in data store 2030. According to one embodiment, server computer 2002 may include computer executable instructions stored on a non-transitory computer readable medium coupled to a processor. The computer executable instructions of server 2002 may be executable to provide a content management application (e.g., content management application 104) to provide a multitenant content management service that supports external users in user groups and manages an object data store in which folders and files are managed as objects.

Computer 2012 can comprise CPU 2040, ROM 2042, RAM 2044, HD 2046, I/O 2048, and communications interface 2049. I/O 2048 can include a keyboard, monitor, printer, electronic pointing device (e.g., mouse, trackball, stylus, etc.), or the like. Communications interface 2049 may include a communications interface, such as a network interface card, to interface with network 2005. Computer 2015 may similarly include CPU 2050, ROM 2052, RAM 2054, HD 2056, I/O 2058, and communications interface 2059. According to one embodiment, client computers 2012, 2012 client applications (e.g., client applications 120) to interact with the content management application.

Each of the computers in FIG. 4 may have more than one CPU, ROM, RAM, HD, I/O, or other hardware components. For the sake of brevity, each computer is illustrated as having one of each of the hardware components, even if more than one is used. Each of computers 2002, 2012 and 2015 is an example of a data processing system. ROM 2022, 2042, and 2052; RAM 2024, 2044, and 2054; HD 2026, 2046, and 2056; and data store 2030 can include media that can be read by CPU 2020, 2040, or 2050. These memories may be internal or external to computers 2002, 2012, or 2015.

Portions of the methods described herein may be implemented in suitable software code that may reside within ROM 2022, 2042, or 2052; RAM 2024, 2044, or 2054; or HD 2026, 2046, or 2056. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods, or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical, or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps, and operations described herein can be performed in hardware, software, firmware, or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. to herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

APPENDIX

```
#Cloud OTDS configuration
otds:
    url: ${OTDS_URL:https://otdsauth-otfc.dev.bp-paas.otxlab.net}
    apiUrl: ${OTDS_API_URL:
    http://otdsapi-otfc.dev.bp-paas.otxlab.net}
authProvider: OTDS
dctm:
    authMechanism: otds
    basic:
        onPremusername:
        onPrempassword:
    otds:
        onPremUrl: <<REPLACE_URL>>
        onPremclientId: <<REPLACE_CLIENT_ID>>
        onPremclientSecret: <<REPLACE_CLIENT_SECRET>>
        onPremusername: <<REPLACE_USERNAME>>
        onPrempassword: <<REPLACE_PASSWORD>>
        tokentimeout: 5
otcs:
```

APPENDIX-continued

```
otds:
  onPremUrl: <<REPLACE_URL>>
  onPremusername: <<REPLACE_USERNAME>>
  onPrempassword: <<REPLACE_PASSWORD>>
otfi:
  basic:
    onPremUrl: <<REPLACE_URL>>
    onPremusername: <<REPLACE_USERNAME>>
    onPrempassword: <<REPLACE_PASSWORD>>
ia:
  authMechanism: otds
  basic:
    onPremUrl:
    onPremclientId:
    onPremclientSecret:
    onPremusername:
    onPrempassword:
  otds:
    onPremUrl: <<REPLACE_URL>>
    onPremclientId: <<REPLACE_CLIENT_ID>>
    onPremclientSecret: <<REPLACE_CLIENT_SECRET>>
    onPremusername: <<REPLACE_USERNAME>>
    onPrempassword : <<REPLACE_PASSWORD>>
# iHub details
ihub:
  authMechanism: basic
  basic:
    onPremUrl: <<REPLACE_URL>>
    onPremusername: <<REPLACE_USERNAME>>
    onPrempassword: <<REPLACE_PASSWORD>>
    dctmOnPremusername:
      <<REPLACE_DOCUMENTUM_USERNAME>>
    dctmOnPrempassword:
      <<REPLACE_DOCUMENTUM_PASSWORD>>
    reportsLocation: <<REPLACE_IHUB_REPORTS_LOCATION>>
    repositoryDocBases: <<REPLACE_REPOSITORY_DOC_
      BASES_COMMA_SEPARATED>>
```

What is claimed is:

1. A system for managing the configuration of services, comprising:
a configuration server comprising a processor and a non-transitory computer readable medium comprising instructions to:
in response to a determined change to a configuration file associated with a service type of a set of service types:
determine the service type associated with the configuration file,
determine configuration data associated with the service type from the configuration file, and
utilize the message service to place a first message on a message queue corresponding to the service type and the first message includes the determined configuration data associated with the service type; and
wherein a service instance of the service type is adapted to:
obtain the first message from the message queue associated with the service type of the service instance, and
configure the service instance according to the configuration data of the obtained first message.

2. The system of claim 1, wherein the configuration file is stored in a versioning system.

3. The system of claim 2, wherein the changed configuration file is a most current version of the configuration file.

4. The system of claim 2, wherein the change to the configuration file was determined based on a commit of the configuration file in the versioning system.

5. The system of claim 1, wherein determining configuration data is done based on a determination that there is an executing service instance of the service type.

6. The system of claim 5, wherein the determination that there is the executing service instance is made using a registry service an identifier for the service type.

7. The system of claim 6, wherein the registry service registers the execution of the service instance of the service type, and the service instance of the service type is adapted to provide a heartbeat message to the registry service.

8. A method, comprising:
in response to a determined change to a configuration file associated with a service type of a set of service types:
determine the service type associated with the configuration file,
determine configuration data associated with the service type from the configuration file, and
utilize the message service to place a first message on a message queue corresponding to the service type and the first message includes the determined configuration data associated with the service type; and
wherein a service instance of the service type is adapted to:
obtain the first message from the message queue associated with the service type of the service instance, and
configure the service instance according to the configuration data of the obtained first message.

9. The method of claim 8, wherein the configuration file is stored in a versioning system.

10. The method of claim 9, wherein the changed configuration file is a most current version of the configuration file.

11. The method of claim 9, wherein the change to the configuration file was determined based on a commit of the configuration file in the versioning system.

12. The method of claim 8, wherein determining configuration data is done based on a determination that there is an executing service instance of the service type.

13. The method of claim 12, wherein the determination that there is the executing service instance is made using a registry service an identifier for the service type.

14. The method of claim 13, wherein the registry service registers the execution of the service instance of the service type, and the service instance of the service type is adapted to provide a heartbeat message to the registry service.

15. A non-transitory computer readable medium, comprising instructions for:
in response to a determined change to a configuration file associated with a service type of a set of service types:
determine the service type associated with the configuration file,
determine configuration data associated with the service type from the configuration file, and
utilize the message service to place a first message on a message queue corresponding to the service type and the first message includes the determined configuration data associated with the service type; and
wherein a service instance of the service type is adapted to:
obtain the first message from the message queue associated with the service type of the service instance, and
configure the service instance according to the configuration data of the obtained first message.

16. The non-transitory computer readable medium of claim 15, wherein the configuration file is stored in a versioning system.

17. The non-transitory computer readable medium of claim 16, wherein the changed configuration file is a most current version of the configuration file.

18. The non-transitory computer readable medium of claim 16, wherein the change to the configuration file was determined based on a commit of the configuration file in the versioning system.

19. The non-transitory computer readable medium of claim 15, wherein determining configuration data is done based on a determination that there is an executing service instance of the service type.

20. The non-transitory computer readable medium of claim 19, wherein the determination that there is the executing service instance is made using a registry service an identifier for the service type.

21. The non-transitory computer readable medium of claim 20, wherein the registry service registers the execution of the service instance of the service type, and the service instance of the service type is adapted to provide a heartbeat message to the registry service.

\* \* \* \* \*